US010715223B2

(12) United States Patent
Alpert et al.

(10) Patent No.: US 10,715,223 B2
(45) Date of Patent: Jul. 14, 2020

(54) MULTI VAP SIMULTANEOUS MULTI-USER TRANSMISSIONS

(71) Applicant: Intel Corporation, Santa Clara, CA (US)

(72) Inventors: Yaron Alpert, Ta (IL); Moshe Moshe, Ta (IL)

(73) Assignee: Intel Corporation, Santa Clara, CA (US)

( * ) Notice: Subject to any disclaimer, the term of this patent is extended or adjusted under 35 U.S.C. 154(b) by 53 days.

(21) Appl. No.: 15/342,271

(22) Filed: Nov. 3, 2016

(65) Prior Publication Data
US 2018/0123656 A1    May 3, 2018

(51) Int. Cl.
| | |
|---|---|
| *H04B 7/0452* | (2017.01) |
| *H04W 76/11* | (2018.01) |
| *H04W 72/04* | (2009.01) |
| *H04W 74/04* | (2009.01) |
| *H04W 84/12* | (2009.01) |
| *H04W 88/08* | (2009.01) |

(52) U.S. Cl.
CPC ...... *H04B 7/0452* (2013.01); *H04W 72/0446* (2013.01); *H04W 74/04* (2013.01); *H04W 76/11* (2018.02); *H04W 84/12* (2013.01); *H04W 88/08* (2013.01)

(58) Field of Classification Search
CPC .... H04B 7/0478; H04B 7/0639; H04B 7/065; H04L 1/0026; H04L 1/0029; H04L 25/03343; H04L 27/2601; H04L 2001/0093; H04W 60/00; H04W 88/08
See application file for complete search history.

(56) References Cited

U.S. PATENT DOCUMENTS

| | | | | |
|---|---|---|---|---|
| 2004/0156399 | A1* | 8/2004 | Eran | H04W 92/20 370/395.5 |
| 2004/0246932 | A1* | 12/2004 | Fischer | H04W 74/02 370/338 |
| 2008/0298482 | A1 | 12/2008 | Rensburg et al. | |
| 2009/0080388 | A1* | 3/2009 | Rohfleisch | H04B 7/024 370/338 |
| 2013/0272211 | A1 | 10/2013 | Quan et al. | |
| 2014/0064257 | A1* | 3/2014 | Fontaine | H04W 72/0446 370/336 |
| 2014/0112175 | A1* | 4/2014 | Pantelidou | H04W 28/26 370/252 |
| 2014/0160964 | A1 | 6/2014 | Trainin | |

(Continued)

FOREIGN PATENT DOCUMENTS

CN    105897477 A    8/2016

OTHER PUBLICATIONS

Search Report dated Jan. 8, 2018 for International Application No. PCT/US2017/058202.

*Primary Examiner* — Oussama Roudani
(74) *Attorney, Agent, or Firm* — Schiff Hardin LLP

(57) ABSTRACT

A transmission method based on Institute of Electrical and Electronics Engineers (IEEE) 802.11 Multi-User (MU) Multiple-Input and Multiple-Output (MIMO). The method includes transmitting, by a plurality of Virtual Access Points (VAPs), respective acknowledgement requests to stations, wherein at least two of the stations are associated with different VAPs of the plurality of VAPs; and transmitting, by the stations to the VAPs, respective block acknowledgements.

19 Claims, 8 Drawing Sheets

(56) References Cited

U.S. PATENT DOCUMENTS

| | | |
|---|---|---|
| 2015/0016558 A1 | 1/2015 | Choi et al. |
| 2015/0163769 A1* | 6/2015 | Lee ........................ H04W 72/04 370/329 |
| 2015/0312804 A1* | 10/2015 | Wang ..................... H04W 28/20 370/329 |
| 2015/0334579 A1 | 11/2015 | Lin et al. |
| 2016/0113009 A1 | 4/2016 | Seok |
| 2017/0150493 A1* | 5/2017 | Seok ..................... H04B 7/0452 |
| 2017/0374681 A1* | 12/2017 | Kim ....................... H04W 74/00 |

\* cited by examiner

Figure 2B
(details of VHT SIG-A1 from Figure 2A)

| Bandwidth | Reserved | STBC | Group ID | Number of space-time streams (user 0) | Number of space-time streams (user 1) | Number of space-time streams (user 2) | Number of space-time streams (user 3) | TXPS Forbidden | Reserved |
|---|---|---|---|---|---|---|---|---|---|
| 2 | 1 | 1 | 6 | 3 | 3 | 3 | 3 | 1 | 1 | bits

Figure 2C
(details of VHT SIG-A2 from Figure 2A)

| Short GI | Short GI Disambiguation | Coding | LDPC Extra Symbol | MU[1] coding | MU[2] coding | MU[3] coding | Reserved | CRC | Tail |
|---|---|---|---|---|---|---|---|---|---|
| 1 | 1 | 1 | 1 | 1 | 1 | 1 | 3 | 8 | 6 | bits

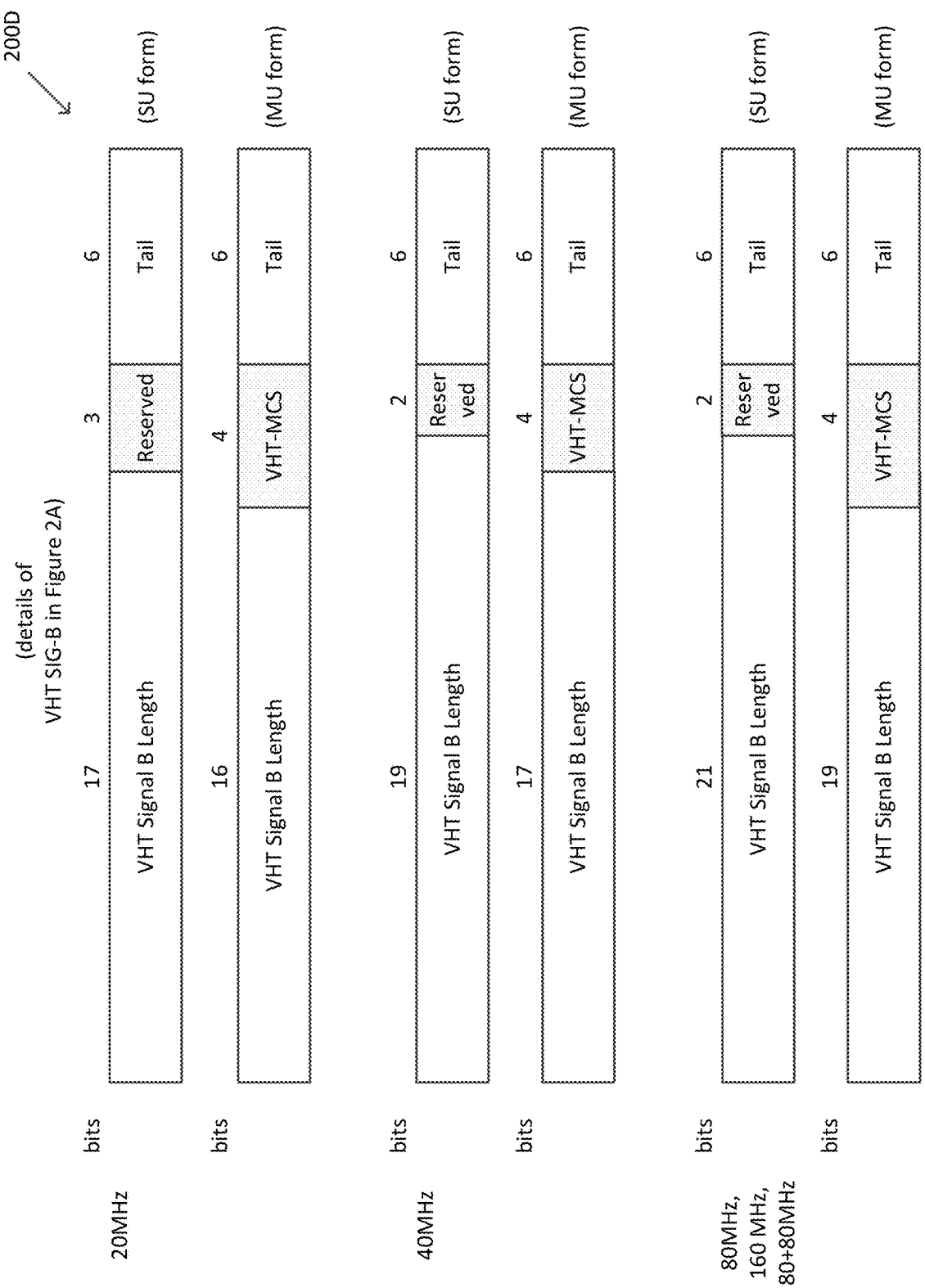

MULTI VAP SIMULTANEOUS MULTI-USER TRANSMISSIONS

TECHNICAL FIELD

The present disclosure generally relates to Institute of Electrical and Electronics Engineers (IEEE) 802.11 multi Virtual Access Point (VAP) simultaneous Multi-User (MU) transmissions.

BACKGROUND

Institute of Electrical and Electronics Engineers (IEEE) 802.11 REV mc D6.0 dated Jun. 5, 2016, is a wireless networking (Wi-Fi) standard Wireless Local Area Networks (WLANs). The $5^{th}$ generation of IEEE 802.11 (802.11ac Very High Throughput (VHT)) supports Downlink (DL) Multi-User Multiple-Input Multiple-Output (MU-MIMO) simultaneous transmissions from an Access Point (AP) to a plurality of stations. MU-MIMO allows an AP to use its spatial multiplexing resources to transmit multiple frames to different stations at the same time and over the same frequency spectrum.

A Virtual AP (VAP)/Basic Service Set Identification (BSSID) is a logical entity that resides within a physical AP and addresses unique requirements of various station groups and encryption types. Using a common physical AP, each VAP associated with the physical AP appears as an independent AP with its own unique BSSID or Medium Access Control (MAC) address.

BRIEF DESCRIPTION OF THE DRAWINGS

FIGS. 2A-D illustrate an IEEE 802.11ac Very High Throughput (VHT) Multi-User (MU) PLCP (Physical Layer Convergence Protocol) Protocol Data Unit (PPDU) frame format.

DESCRIPTION OF THE ASPECTS

The present disclosure is directed to allocating a plurality of concurrent (spatial) streams in Institute of Electrical and Electronics Engineers (IEEE 802.11) Multi-User Multiple-Input Multiple-Output (MU-MIMO) simultaneous transmission to each of a plurality of stations associated with different Virtual Access Points (VAPs). Also, the disclosure is directed to a mechanism for simultaneous medium sharing, channel selection, scheduling, and coordination of transmit opportunity over the VAPs prior to data transmission.

By way of overview, this disclosure addresses a standard-compliant implementation, at a physical Access Point (AP) to any standard station, for supporting Multiple VAPs/BSSIDs (M-VAPs/M-BSSIDs) medium sharing, channel selection M-VAP scheduling, and M-VAP resource allocation for simultaneous coordinated VHT DL MU-MIMO transmissions. The M-VAPs/M-BSSIDs may be allocated in a same devise or in a set of distributed devices.

The implementation dynamically allocates a plurality of concurrent (spatial) streams in IEEE 802.11 MU-MIMO simultaneous transmission to each of a plurality of served stations associated with different VAPs. Also, the implementation maximizes total data transmitted on each simultaneous transmission and/or addresses other MU scheduling limitations, such as Quality of Service (QoS).

This implementation solves the issue mentioned above about simultaneous coordinated IEEE 802.11 transmissions from M-VAPs/M-BSSIDs to a plurality of stations associated with different VAPs. Also, the implementation defines a mechanism for IEEE 802.11 VAP's simultaneous medium sharing, channel selection, scheduling, and coordination of transmit opportunity (TXOP) over M-VAPs prior to transmission.

The implementation is based on the following three functionalities that extend the AP's operation phases.

First, during the VAP's association and capabilities exchange with a specific station, the M-VAP conducts Group Identifications (IDs) sharing between VAPs able to generate MU user groups that comprise stations from different VAPs.

Second, during the VAP's channel access phase, M-VAP medium sharing and channel selection is conducted. An example is signaling between an M-VAP and one or more coordinators, or based on air access detection of one or more of the VAPs.

Third, during the M-VAP's transmission operating phase, a M-VAP common TXOP sequence format is conducted. The M-VAP common TXOP sequence format comprises resource allocation indicated in the 802.11 preamble SIG-A and SIG-B transmission, M-VAP data transmission where the AP transmits simultaneously PPDUs to stations associated with different VAPs, and also M-VAP acknowledgements (ACKs) are solicited by a plurality of VAPs during a same TXOP using Block Acknowledgment Requests (BARs).

Figure 1:
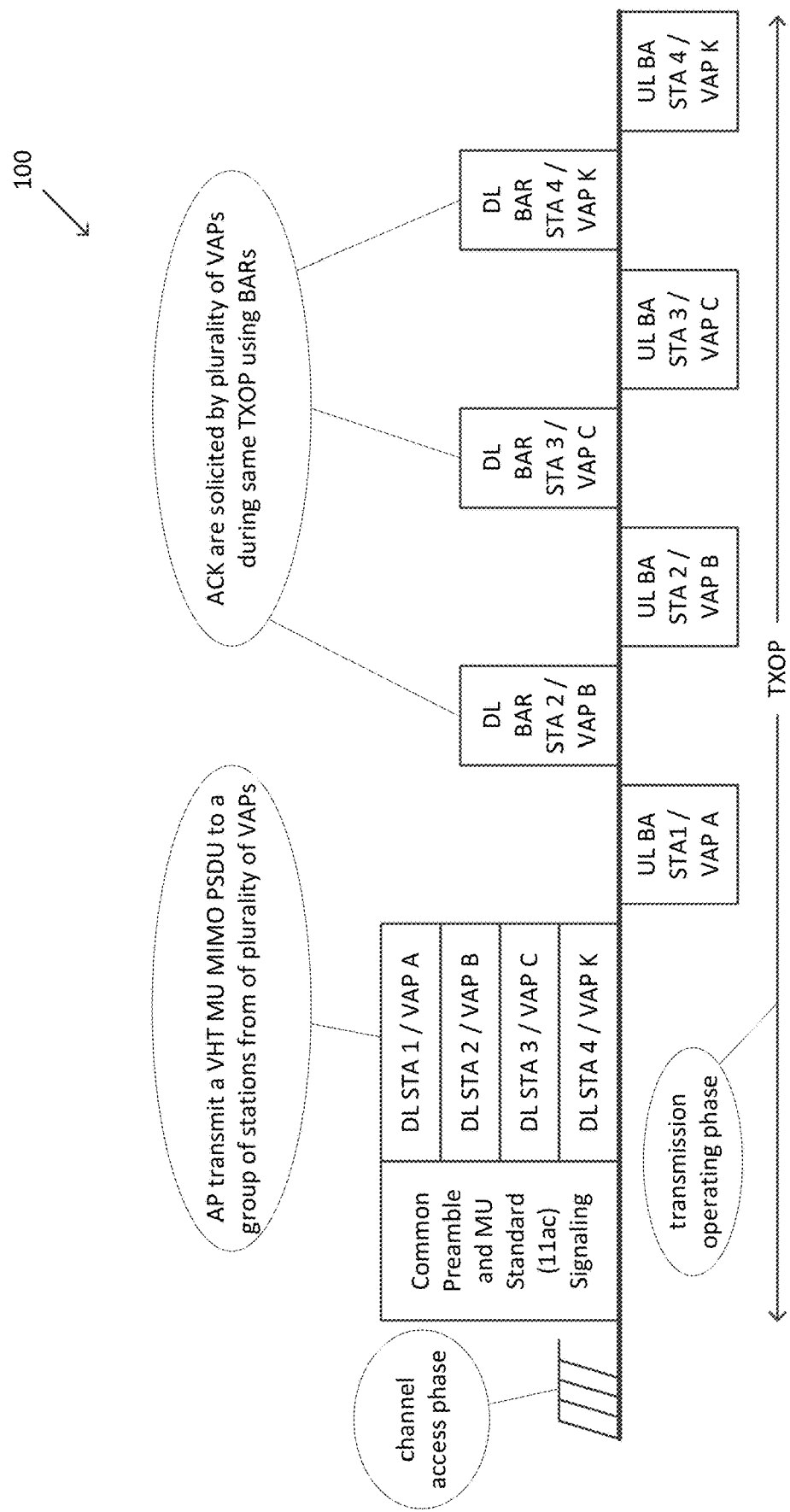
FIG. 1 illustrates a Multiple Virtual Access Point (M-VAP) transmission common opportunity (TXOP) sequence format in accordance with an aspect of the disclosure.

FIG. 1 illustrates a Multiple Virtual Access Point (M-VAP) common transmission opportunity (TXOP) sequence format 100 in accordance with an aspect of the disclosure.

By way of overview, this is an example sequence 100 of an M-VAP-STM (Simultaneous Transmission Manager) flow of combined simultaneous M-VAP MU IEEE 802.11 simultaneous transmissions to a plurality of stations and station M-VAP acknowledgments (ACKs) of these transmissions.

The figure shows the channel access phase on the left side, and then the transmission operating phase. The transmission opportunity (TXOP) is the duration of transmitting and receiving information sequence.

During the transmission operating phase, the AP transmits a common preamble in the DL in a same transmission (i.e., same PSDU) simultaneously to a plurality of stations that are associated with M-VAPs. The common preamble comprises a M-VAP Group ID for stations that belong to different VAPs but are grouped together. The transmission also comprises specific user positions for the respective stations. At VHT, the information is transmitted simultaneously to a group of up to four stations, which is accordance with the IEEE 802.11ac standard, and every station has a unique special stream. Although this exemplary figure shows each of the four stations associated with a different VAP, the disclosure is not limited in this respect. Alternatively, there may be two stations associated with a single VAP, or any other combination of up to four stations. Of course it is envisioned that in a different version of the standard or in a non-standard implementation, there may be greater than four stations signaled in a same transmission, and there can be several cycles of transmission.

Subsequently, an acknowledgement (ACK) procedure is performed during the same TXOP. Each station acknowledges that it received the information correctly. This is based a standard 802.11ac acknowledgement procedure when the BAR is sent by different VAPs according to the previous DL simultaneous MU transmission.

More specifically, following the common preamble, station 1 immediately transmits in the uplink (UL) a Block Acknowledgement (BA); {YA: note that other variant can be that STA 1 can also be solicited by BAR} this of course assumes that the information is received and decoded by station 1 correctly. Next, VAP B solicits in the DL a Block Acknowledgement Request (BAR) to station 2, and in response station 2 transmits in the UL a BA. VAP C solicits in the DL a BAR to station 3, and in response station 3 transmits in the UL a BA. And finally, VAP K solicits in the DL a BAR to station 4, and in response station 4 transmits in the UL a BA. Alternatively, station 1 may also be solicited by a BAR. These transmissions occur in the same TXOP. Also, the order of the ACKs is not limited.

In the common first part of the transmission, which is a DL transmission, on the left there are four VAP transmissions. The other transmissions, which are UL transmissions, comprise only one VAP transmission each. This is because in the IEEE 802.11ac standard, simultaneous transmissions may be limit to DL MU only.

A difference of the implementation of this disclosure from the standard implementation is the AP transmits simultaneity to stations that are associated with different VAPs. Also, ACKs are solicited by M-VAPs during a same TXOP using BARs. A M-VAP allocates a set of Group IDs within the VAPs that enable generation of IEEE 802.11 MU-MIMO transmissions to any group of stations, regardless of associated VAP(s).

FIGS. 2A-D illustrate an IEEE 802.11ac Very High Throughput (VHT) Multi-User (MU) physical frame format 200.

Figure 2A:
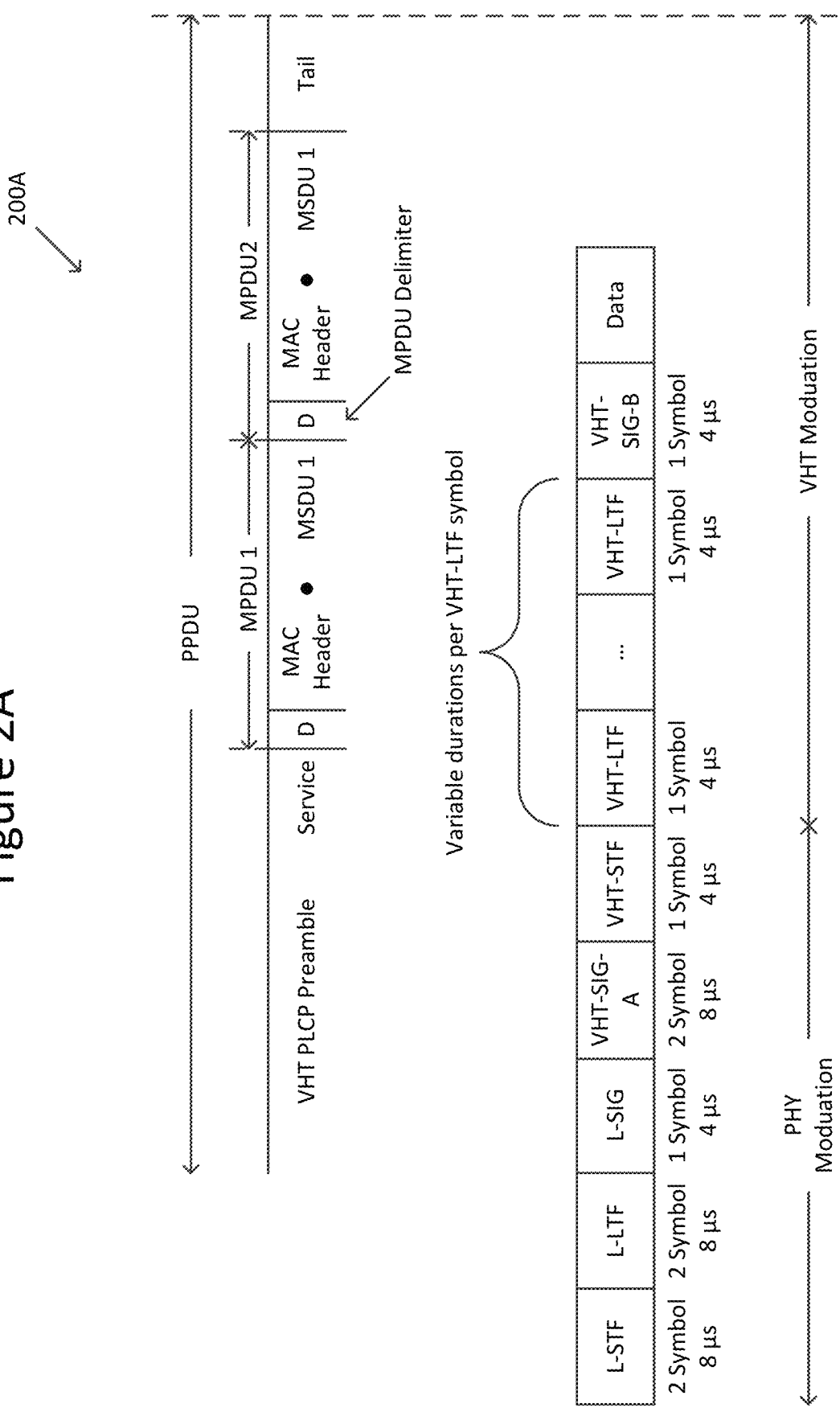

FIG. 2A illustrates an overview of the VHT PPDU physical frame format. FIGS. 2B-2C illustrates details of portions of the VHT preamble SIG-A physical frame format of Figure A data transmission preamble. More specifically, FIGS. 2B and 2C illustrate details of VHT SIG-A1 and VHT SIG-A2 VHT preamble fields, respectively, of the VHT SIG-A portion of FIG. 2A. FIG. 2D illustrates the details of VHT preamble SIG-B of FIG. 2A data transmission preamble.

As is known from the IEEE 802.11ac standard, a VHT preamble SIG-A is transmitted as a single common signaling field duplicated per MU station, and comprises information about station-specific resource allocation. VHT preamble SIG-A field is divided into two parts: VHT SIG-A1 and VHT SIG-A2. VHT preamble SIG-B, unlike VHT SIG-A, is not transmitted to all stations as one common block. A plurality of VHT SIG-Bs are propagated in the direction of the stations, the direction being chosen according to a steering matrix prepared by the AP. There are several SIG-B formats based on transmission bandwidth. VHT SIG-A1, which is shown in FIG. 2B, includes the Group ID and user positions 0 to 3.

PLCP stands for Physical Layer Convergence Protocol, PPDU stands for PLCP Physical Layer Convergence Procedure Protocol Data Unit, and MPDU stands for Medium Access Control Protocol Data Unit.

IEEE 802.11ac introduces these VHT preamble fields to assist WLANs in obtaining common and per station PPDU decoding parameters. A Group ID field is added in VHT parameters SIG-A field, which is used to inform targeted stations about a MU-MIMO transmission to follow and indicate which stations are expected to be served in this PPDU. The current IEEE 802.11ac standard implementation limit the Group-ID to be shared between more than one VAP; when gaining access to a channel, only single entity (AP or VAP) can conduct VHT MU-MIMO transmissions. The implementation of this disclosure allows simultaneous, coordinated VHT transmissions of a plurality of entities, that is, M-VAPs/M-BSSs using a common physical and radio frequency interface.

Figure 3:
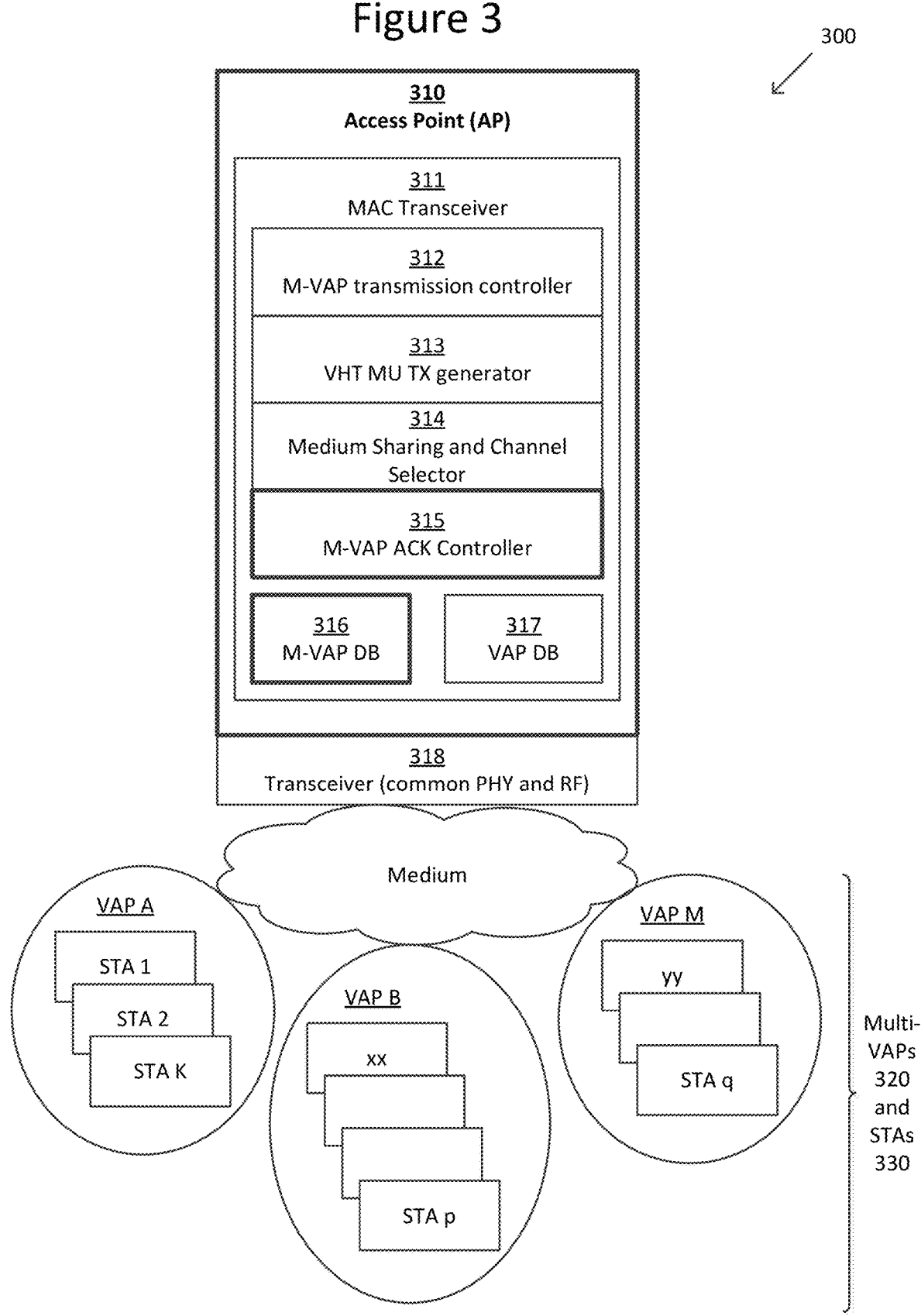
FIG. 3 illustrates a schematic diagram of a wireless system comprising an Access Point (AP) acting as a Multiple-VAP (M-VAP), a plurality of Virtual Access Points (VAPs), and a plurality of stations in accordance with an aspect of the disclosure.

FIG. 3 illustrates a schematic diagram of a wireless system 300 comprising an Access Point (AP) 310 acting as a Multiple VAP (M-VAP), a plurality of Virtual Access Points (VAPs) 320, and a plurality of stations 330 in accordance with an aspect of the disclosure.

The AP (M-VAP) 310 comprises a MAC transceiver 311. The MAC transceiver 311 comprises a M-VAP transmission controller 312, a MU transmission generator 313, a medium sharing and channel selector 314, an M-VAP acknowledgement controller 315, a M-VAP database 316, a VAP database 317, and a transceiver 318.

The M-VAP transmission controller 312 is configured to perform channel selection, station selection, resource allocation per station, scheduling, M-VAP Group ID allocation, etc.

The MU transmission generator 313 and the medium sharing and channel selector 314 are known. For the sake of brevity, their descriptions will not be included here.

The M-VAP ACK controller 315 is configured to control an acknowledgement procedure. This procedure is described in detail below.

The M-VAP database 316 is configured to store a common M-VAPs Group IDs table that associates VAPs 320 and a plurality of stations 330. The M-VAPs database is configured to store user positions of the respective stations. The M-VAPs Groups IDs table is explained below with respect to FIG. 4. The user positions were explained above with respect to FIG. 2B, and are explained below with respect to FIG. 4.

The transceiver 318 has a common physical and radio frequency interface to communication with a plurality of VAPs 320. The M-VAP 310 communicates via the transceiver 318 with a plurality of VAPs A, B . . . M 320 via a common medium. The VAPs 320 have associated stations; in the current IEEE 802.11 standard, up to four stations. In the example shown, VAP A is associated with station 1, station 2, and station K; VAP B is associated with stations xx . . . p; VAP M is associated with stations yy . . . q.

This implementation of this disclosure is a standard-compliant method for supporting M-VAP/M-BSS medium sharing, channel selection M-VAP scheduling, and M-VAP resource allocation for simultaneous coordinated DL MU transmissions. The implementation enables dynamic allocation of a plurality of concurrent (spatial) streams in a MU-MIMO transmission to each of a plurality of served stations associated with different VAPs. The implementation maximizes total data transmitted on each transmission and/or considers other MU scheduling limitations, such as Quality of Service (QoS).

The implementation is based on the three functionalities: (1) M-VAP Group IDs sharing between VAPs; (2) M-VAP medium sharing and channel selection; and (3) M-VAP common TXOP sequence format. These functionalities are described in detail below.

(1) M-VAP Group IDs Sharing Between VAPs

Figure 4:
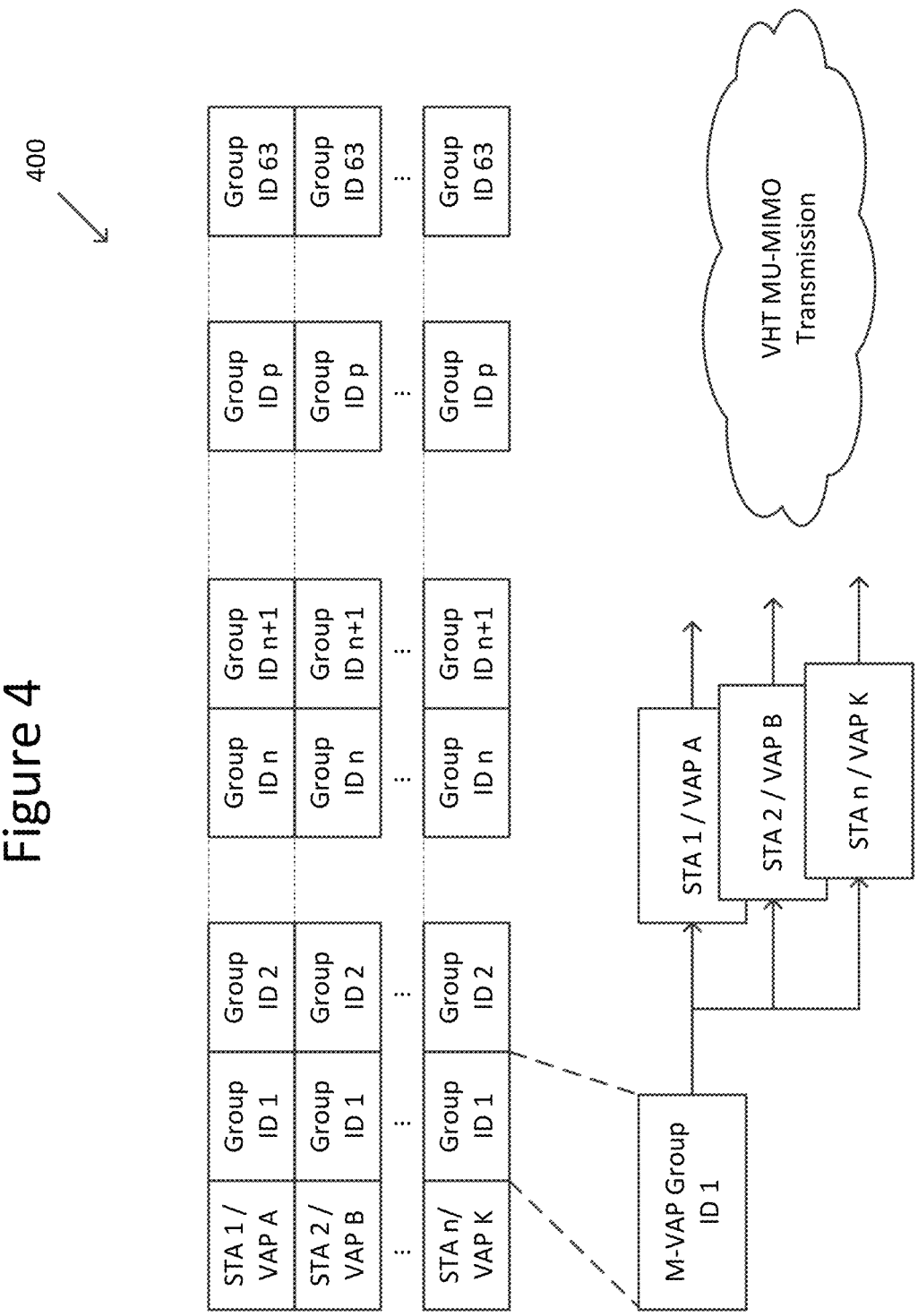
FIG. 4 illustrates a diagram of a method for mapping and assigning group identifications to stations in accordance with an aspect of the disclosure.

The first functionality is M-VAP Group ID sharing between VAPs 320. The implementation stores a common M-VAP Group IDs table, as shown in FIG. 4 and described below, in which a specific Group ID may comprise a plurality of stations 330 from more than one VAP 320, that is, different BSSIDs.

The implementation efficiently maps and assigns management Group IDs to stations that support MU-MIMO transmission.

The AP 310 can allocate a set of Group IDs into pool of potential MU stations (based on number of stations in the pool). The AP 310 can create any group of stations without updating the group, that is, without sending Group ID signaling to the existing stations. If there is a need, the M-VAP transmission controller 312 can generate a new Group ID. Also, if the station is disassociated, the M-VAP transmission controller 312 can exclude the station from the Group ID.

(2) M-VAP Medium Sharing and Channel Selection

The second functionality is M-VAP medium sharing and channel selection. When a VAP 320 (i.e., a BSS) gains a common channel, via IEEE 802.11 CSMA/CA protocol, the VAP 320 may share the channel with other VAPs 320 for a common MU-MIMO transmission. This functionality enables a best selection of the M-BSS channel access parameters. A plurality of concurrent (spatial) streams are dynamically allocated in a MU-MIMO transmission to each of a plurality of served stations associated with different VAPs 320 in order to maximize the total data transmitted in each transmission and/or considering other MU-scheduling limitation, such as Quality of Service (QoS).

An implementation method for a M-VAP Simultaneous Transmission opportunity Manager (M-VAP-STM) function interfaces with all the VAPs 320 to monitor their Enhanced Distributed Coordination Function (EDCF) decisions and indicate when a MU-MIMO transmission can be applied. The M-VAP STM can also decide that a M-VAP MU-MIMO transmission can conduct and coordinate the M-VAP medium sharing (at frequency and time domain), MU-MIMO methodology and specific common transmission MU-MIMO parameters (at MAC and physical levels) including selection of the M-VAP Group ID.

The M-VAP STM's set of M-VAP selection criteria to share a same MU-MIMO transmission may be based on the following parameters for the selection of a fraction of M-VAP STMs: M-VAP station connectivity, M-VAP station QoS Key Performance Indicators (KPIs), M-VAP station link level KPIs (e.g., power, SNR, ESNR, SINR, link budget, noise floor, number of station receive antennas, channel status information feedback, etc.), VAPs mutual interferences level KPIs (e.g., power, SNR, ESNR, SINR, link budget, number of station receive antennas, channel status information feedback, computing a pre-coding matrix, etc.), etc.

The M-VAP STM may also comprise a mechanism for guaranteeing M-VAP's fairness or give priority (based on pre-define criteria) among the M-VAPs 310 and other coexisting stations 330, and in general results in identical performance between M-VAPs 310 and stations 330. This mechanism increases the M-VAP's performance and also the aggregate network performance (i.e., the total throughput transmitted over the common channel), at the expense of higher throughput for the M-VAPs 310 than for the stations 330 (if they exist) associated with each of the M-VAPs 310.

The IEEEE 802.11 standard has each VAP 320 having its own access channel and does not share the medium access within the TXOP. In the implementation of this disclosure, the VAPs share a common channel.

(3) M-VAP Common TXOP Sequence Format

The third functionality is M-VAP common TXOP sequence format generation and execution. The M-VAP 310 can generate a TXOP that comprises at least one MU-MIMO transmission (using orthogonal SIG-A/B transmissions) and an M-VAP acknowledgment. The result is enablement of resource sharing between the VAPs 320. The TXOP sequence can potentially comprise protection (i.e., Request to Send (RTS)/Clear To Send (CTS), CTS-to-self (CTS2self), etc.) PPDUs, MU-MIMO sounding (Null Data Packet (NDP), NDP Announcement (NDPA), Beam Forming (BF) reports, etc.), etc. The MU-MIMO transmission initiation is based on a standard channel access procedure.

A common MU-MIMO physical frame (PPDU/SDU) comprising a plurality of concatenated MAC frames is transmitted, wherein every MAC frame can be sent to stations 330 associated with different VAPs 320. The physical frame concatenated MAC frames comprise: a common physical element, (including SIG-A) a physical concatenated signaling element (VHT SIG-B per station), a physical synchronization element (per concatenated MAC frame Long Training Field (LTF)/VHT Short Training Field (STF)), and a concatenated MAC frame per VAP 320 that has associated therewith the selected station 330 from this VAP 320.

As is known, the LTF comprises a sequence of symbols that set up demodulation of the rest of the frame, starting with the VHT SIG-B field. The VHT STF assists a receiver in detecting a repeating pattern and setting receiver gain. SIG-B is sent per station, LTF is sent per service set, and STF is common.

In order to transmit MU-MIMO physical frame concatenated MAC frames to a plurality of VAPs stations, there is alignment and selection of the specific simultaneous transmission parameters that set at the SIG-A and SIG-B elements. These parameters comprise alignment (between VAPs 320) and selection of a common MU Group ID, Space-Time Scheduling (STS) allocation, and station selection (as defined above in the Group IDs sharing between VAPs section); alignment (between VAPs 320) and selection of the stations 330 going to be transmitted simultaneously; selection of a common M-VAP transmission methodology, etc.

The selection of the station-specific transmission parameters (e.g., Modulation and Coding Scheme (MCS) and number of service sets) considering the simultaneous transmission of other selected stations 330 is performed using legacy VHT procedures. Also the proposed VHT SIG-A and the VHT SIG-B are VAP-agnostic because they are generated using the M-VAP Group ID sharing between VAPs 320, as described above.

FIG. 4 illustrates a diagram 400 of a method for mapping and assigning M-VAP Group IDs to stations in accordance with an aspect of the disclosure.

In IEEE 802.11ac the M-VAP Group ID allocation sent to specific stations, which in the top portion of the figure, is mapped to a common M-VAP Group ID. This M-VAP Group ID is used at the VHT MU-MIMO transmission, which is shown in the bottom of the figure, VHT SIG-A and VHT SIG-B to indicate the plurality of stations and specific resource allocation per station participating in this M-VAP PSDU transmission.

Every station 330 has an assigned M-VAP Group ID and user position. In this implementation of this disclosure, the AP 310 may transmit in the DL simultaneously to multiple VAPs 320 stations. In this example, Group ID #1 is encircled. The diagram indicates that the AP 310 may transmit in the DL simultaneously to station 1, station 2, and station K, which are associated with different VAPs 320.

When a station 330 is connecting to an AP 310, there is an association capability exchange. The AP 310 transmits to each station 330 in a PPDU the M-VAP Group ID and a specific user position. The user position is the position at which the station 330 receives transmissions at this M-VAP Group ID. The stations 330 need to know in advance its Group ID and user position in order to know where to decode a specific PPDU. The station 330 then determines from the physical frame the relevant decoding information. The station 330 then decodes the information transmitted on its allocated virtual channel. If the station 330 decides based on the MAC layer signaling that information belongs to it, the station 330 continues to decode and transfers the information to a higher layer. Alternatively, if the information does not belong to the station 330, the station 300 rejects the information.

Figure 5:
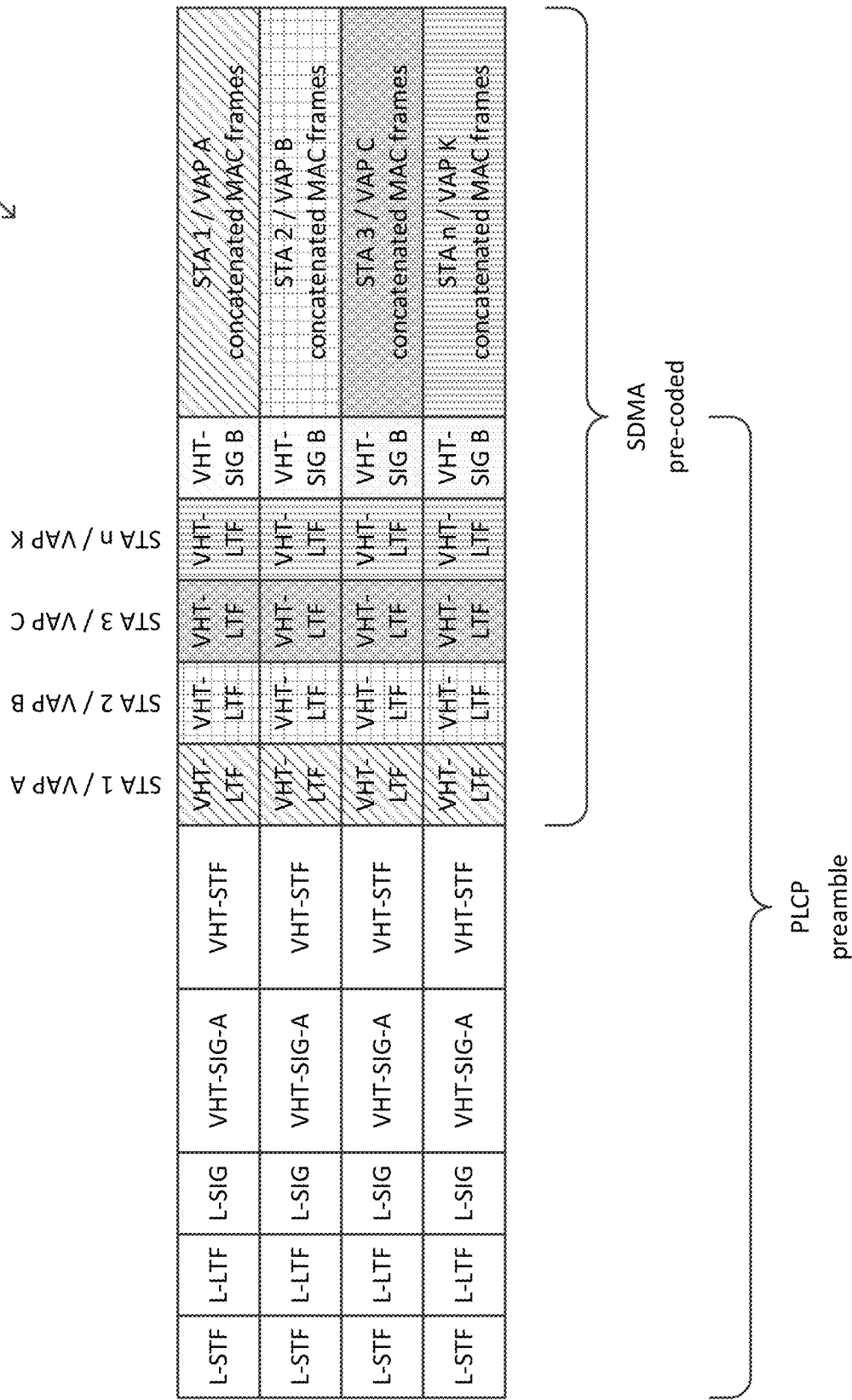
FIG. 5 illustrates a diagram of a method for physical frame concatenated Medium Access Control (MAC) frames space time stream.

FIG. 5 illustrates a diagram 500 of a method for physical frame concatenated Medium Access Control (MAC) frames space time stream.

The diagram 500 illustrates a preamble for stations 330 Spatial Division Multiple Access (SDMA) pre-coded with different VAP 320 s. In this example, station 1 is associated with VAP A, station 2 is associated with VAP B, station 3 is associated with VAP C and station n is associated with VAP K. The PLCP comprises the VHT-LTF for each of the stations 330. As explained above and as known, the VHT LTF comprises a sequence of symbols that set up demodulation of the rest of the frame, starting with the VHT SIG-B field. Each VAP 320 is illustrated for the purposes of explanation using different hatching, with the respective VHT-LTF having matching hatching. The VHT SIG-A and VHT SIG-B are VAP-agnostic because they are generated using the Group IDs shared between VAPs, as described above.

Figure 6:
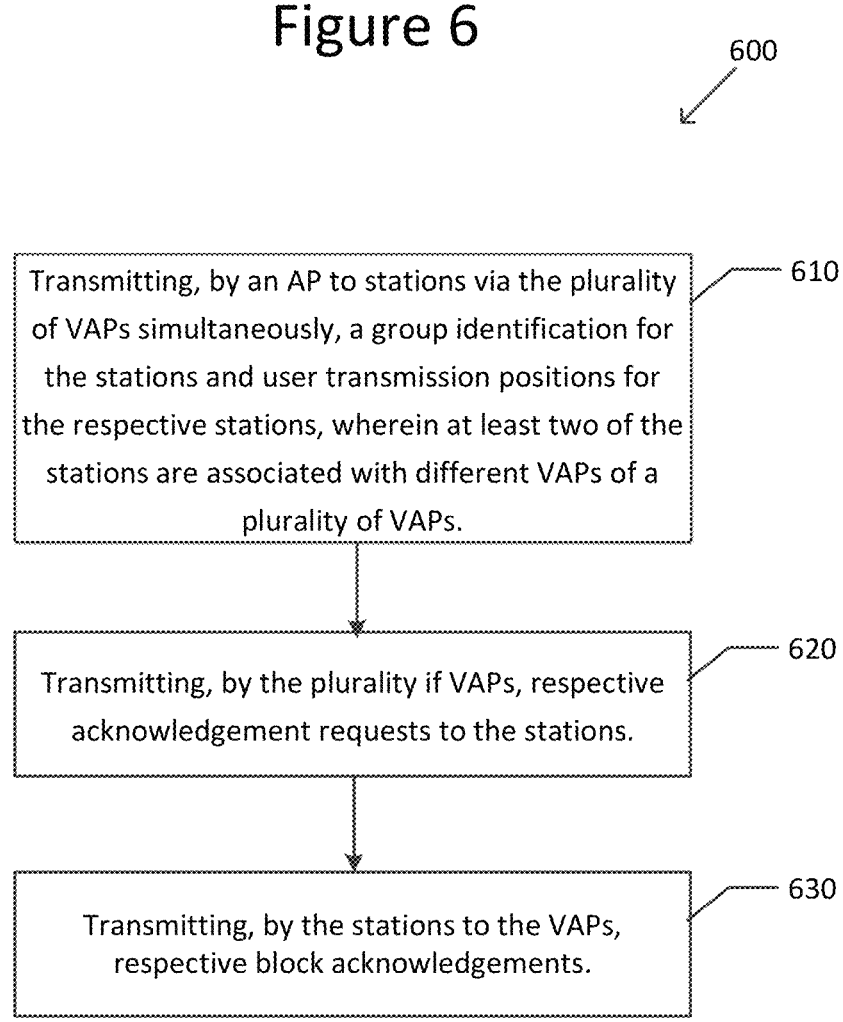
FIG. 6 illustrates a flowchart of a Very High Throughput (VHT) Multi-User (MU) Multiple-Input and Multiple-Output (MIMO) transmission method in accordance with an aspect of the disclosure.

FIG. 6 illustrates a flowchart 600 of a Very High Throughput (VHT) Multi-User (MU) Multiple-Input and Multiple-Output (MIMO) transmission method in accordance with an aspect of the disclosure.

In Step 610, transmitting, by an AP 310 to stations 330 via the plurality of VAPs 320 simultaneously, a M-VAPs Group ID for the stations 330 and user transmission positions for the respective stations 330, wherein at least two of the stations 330 are associated with different VAPs 320 of a plurality of VAPs 320.

In Step 620, transmitting, by the plurality if VAPs 320, respective acknowledgement requests (BARS) to the stations 330.

In Step 630, transmitting, by the stations 330 to the VAPs 320, respective block acknowledgements (ACKs).

Advantages of the implementation of this disclosure are many. Some of these advantages are described in the following paragraphs.

First, throughput and air occupancy are optimized. MU-MIMO transmissions are able to be conducted for a plurality of stations simultaneously without taking into consideration the VAP's association limitations.

Second, the MU signaling protocol is optimized. There is no need for sending an additional Group ID per VAP.

Third, protocol complexity and overhead is reduced. More specifically, the MU-MIMO limitation is reduced.

Fourth, station delays are reduced. There is no need to wait for the next transmission opportunity (TXOP).

Fifth, there is power optimization. Stations from multiple VAPs may be commonly scheduled during the stations' availability during high power periods.

Sixth, the system load, that is, air occupancy, is reduced.

The disclosure is also directed to the following examples.

Example 1 is a transmission method based on Institute of Electrical and Electronics Engineers (IEEE) 802.11 Multi-User (MU) Multiple-Input and Multiple-Output (MIMO), the method comprising: transmitting, by a plurality of Virtual Access Points (VAPs), respective acknowledgement requests to stations, wherein at least two of the stations are associated with different VAPs of the plurality of VAPs; and transmitting, by the stations to the VAPs, respective block acknowledgements.

Example 2 is the subject matter of Example 1, wherein the transmitting is based on IEEE 802.11ac Very High Throughput (VHT) MU-MIMO.

Example 3 is the subject matter of Example 1, wherein the transmitting by the plurality of VAPs and the transmitting by the stations occur during a same transmission opportunity.

Example 4 is the subject matter of Example 1, further comprising: transmitting, by an Access Point (AP) to the stations via the plurality of VAPs simultaneously, a common group identification for the stations and user transmission positions for the respective stations.

Example 5 is the subject matter of Example 1, further comprising: transmitting, by an Access Point (AP) to the stations via the plurality of VAPs simultaneously, a frame comprising a common Multiple-VAP group identification for the stations.

Example 6 is the subject matter of Example 5, wherein the transmitting by the AP occurs within a same Physical Layer Convergence Procedure (PLCP) Protocol Data Unit (PPDU).

Example 7 is the subject matter of Example 4, wherein the transmitting by each of the AP, the plurality of VAPs, and the stations occur during a same transmission opportunity.

Example 8 is the subject matter of Example 1, further comprising: selecting a common channel for the plurality of VAPs.

Example 9 is the subject matter of Example 8, wherein the common channel for the plurality of VAPs is selected based on a criteria selected from a group of criteria consisting of connectivity, Quality of Service (QoS), and Key Performance Indicators (KPIs).

Example 10 is the subject matter of Example 8, further comprising: dynamically allocating, based on physical transmission frames, concurrent spatial streams in a transmission to the stations.

Example 11 an Access Point (AP) configured to operate based on Institute of Electrical and Electronics Engineers (IEEE) 802.11 Multi-User (MU) Multiple-Input and Multiple-Output (MIMO), the AP comprising: a transmission controller configured to control the AP with communication with Virtual Access Points (VAPs); and an acknowledgement controller configured to transmit acknowledgement control signals via the transceiver to the plurality of VAPs to control the plurality of VAPs to: transmit respective acknowledgement requests to stations, wherein at least two of the stations are associated with different VAPs of the plurality of VAPs; and receive, from the stations, respective block acknowledgements.

Example 12 is the subject matter of Example 11, wherein the transmitting is based on IEEE 802.11ac Very High Throughput (VHT) MU-MIMO.

Example 13 is the subject matter of Example 11, wherein the transmitting and receiving occur during a same transmission opportunity.

Example 14 is the subject matter of Example 11, further comprising: a database comprising a common group identification for the stations, and comprising user transmission positions for the respective stations, wherein the transmission controller is further configured to control a transmission, to the stations simultaneously, of the common group identification and the user transmission positions.

Example 15 is the subject matter of Example 11, wherein the transmission controller is further configured to transmit to the stations via the plurality of VAPs simultaneously, a frame comprising a common Multiple-VAP group identification for the stations.

Example 16 is the subject matter of Example 14, wherein the transmitting of the group identification and the user positions occurs within a same Physical Layer Convergence Procedure (PLCP) Protocol Data Unit (PPDU).

Example 17 is the subject matter of Example 14, wherein the transmitting of the acknowledgement requests, the reception of the block acknowledgements, and the transmitting of the group identification and the user positions occur during a same transmission opportunity.

Example 18 is the subject matter of Example 11, further comprising: a medium sharing and channel selection controller configured to select a common channel for the plurality of VAPs.

Example 19 is the subject matter of Example 18, wherein the common channel for the VAPs is selected based on a criteria selected from a group of criteria consisting of connectivity, Quality of Service (QoS), and Key Performance Indicators (KPIs).

Example 20 is the subject matter of Example 18, wherein the transmission controller is further configured to dynamically allocate, based on physical transmission frames, a number of concurrent spatial streams in a transmission to the stations.

Example 21 is a wireless system based on IEEE 802.11 simultaneous Multi-User (MU) Multiple-Input and Multiple-Output (MIMO), comprising: the AP, the plurality of VAPs, and the stations of Example 11.

Example 22 is the subject matter of Example 21, wherein the AP further comprises: a database comprising a common group identification for the stations, and comprising user transmission positions for the respective stations, wherein the transmission controller is further configured to control a transmission, to the stations simultaneously, of the common group identification and the user transmission positions.

Example 23 is an Access Point (AP) configured to operate based on Institute of Electrical and Electronics Engineers (IEEE) 802.11 Multi-User (MU) Multiple-Input and Multiple-Output (MIMO), the AP comprising: a transmission controlling means for controlling the AP in communicating with Virtual Access Points (VAPs); and an acknowledgement controlling means for transmitting acknowledgement control signals via the transceiver to the plurality of VAPs to control the plurality of VAPs to: transmit respective acknowledgement requests to stations, wherein at least two of the stations are associated with different VAPs of the plurality of VAPs; and receive, from the stations, respective block acknowledgements.

Example 24 is the subject matter of Example 23, wherein the transmitting is based on IEEE 802.11ac Very High Throughput (VHT) MU-MIMO.

Example 25 is the subject matter of Example 23, wherein the transmitting and receiving occur during a same transmission opportunity.

Example 26 is the subject matter of Example 23, further comprising: a database comprising a common group identification for the stations, and comprising user transmission positions for the respective stations, wherein the transmission controlling means is further for controlling a transmission, to the stations simultaneously, of the common group identification and the user transmission positions.

Example 27 is the subject matter of Example 23, wherein the transmission controlling means is further for transmitting to the stations via the plurality of VAPs simultaneously, a frame comprising a common Multiple-VAP group identification for the stations.

Example 28 is the subject matter of Example 26, wherein the transmitting of the group identification and the user positions occurs within a same Physical Layer Convergence Procedure (PLCP) Protocol Data Unit (PPDU).

Example 29 is the subject matter of Example 26, wherein the transmitting of the acknowledgement requests, the reception of the block acknowledgements, and the transmitting of the group identification and the user positions occur during a same transmission opportunity.

Example 30 is the subject matter of any of Examples 23-29, further comprising: a medium sharing and channel selection controlling means for selecting a common channel for the plurality of VAPs.

Example 31 is the subject matter of Example 30, wherein the common channel for the VAPs is selected based on a criteria selected from a group of criteria consisting of connectivity, Quality of Service (QoS), and Key Performance Indicators (KPIs).

Example 32 is the subject matter of Example 31, wherein the transmission controlling means is further for dynamically allocating, based on physical transmission frames, a number of concurrent spatial streams in a transmission to the stations.

Example 33 is a wireless system based on IEEE 802.11 simultaneous Multi-User (MU) Multiple-Input and Multiple-Output (MIMO), comprising: the AP, the plurality of VAPs, and the stations of any of Examples 23-29.

Example 34 is the subject matter of Example 33, wherein the AP further comprises: a database comprising a common group identification for the stations, and comprising user transmission positions for the respective stations, wherein the transmission controlling means is further for controlling a transmission, to the stations simultaneously, of the common group identification and the user transmission positions.

Example 35 is an apparatus substantially as shown and described.

Example 36 is a method substantially as shown and described.

While the foregoing has been described in conjunction with exemplary aspect, it is understood that the term "exemplary" is merely meant as an example, rather than the best or optimal. Accordingly, the disclosure is intended to cover alternatives, modifications and equivalents, which may be included within the scope of the disclosure.

Although specific aspects have been illustrated and described herein, it will be appreciated by those of ordinary skill in the art that a variety of alternate and/or equivalent implementations may be substituted for the specific aspects shown and described without departing from the scope of the present application. This application is intended to cover any adaptations or variations of the specific aspects discussed herein.

The invention claimed is:

1. A transmission method based on Institute of Electrical and Electronics Engineers (IEEE) 802.11 Multi-User (MU) Multiple-Input and Multiple-Output (MIMO), the method comprising:
    transmitting, by a plurality of Virtual Access Points (VAPs), respective acknowledgement requests to stations, wherein at least two of the stations are associated with different VAPs of the plurality of VAPs;
    selecting a common communication access channel for the plurality of VAPs;
    transmitting, by the stations to the VAPs, respective block acknowledgements; and
    simultaneously transmitting, by an Access Point (AP) via the plurality of VAPs, a frame to the at least two of the stations that are associated with different VAPs,
    wherein the frame comprises a common Multiple-VAP group identification for the at least two of the stations, and
    wherein (i) transmitting the respective acknowledgment requests to the stations, (ii) simultaneously transmitting the frame to the at least two of the stations, and (iii) transmitting the respective block acknowledgements by the stations, all occur within a same transmission opportunity (TXOP) using the selected common communication channel.

2. The transmission method of claim 1, wherein the transmitting is based on IEEE 802.11ac Very High Throughput (VHT) Multi-User Multiple-Input Multiple-Output (MU-MIMO).

3. The transmission method of claim 1, wherein the frame further comprises:
    user transmission positions for the respective stations.

4. The method of claim 1, wherein the transmitting of the frame by the AP occurs within a same Physical Layer Convergence Procedure (PLCP) Protocol Data Unit (PPDU).

5. The transmission method of claim 3, wherein the transmitting by each of the AP, the plurality of VAPs, and the stations occur during a same transmission opportunity.

6. The transmission method of claim 1, wherein the common channel for the plurality of VAPs is selected based on a criteria selected from a group of criteria consisting of connectivity, Quality of Service (QoS), and Key Performance Indicators (KPIs).

7. The transmission method of claim 1, further comprising:
    dynamically allocating, based on physical transmission frames, concurrent spatial streams in a transmission to the stations.

8. An Access Point (AP) configured to operate based on Institute of Electrical and Electronics Engineers (IEEE) 802.11 Multi-User (MU) Multiple-Input and Multiple-Output (MIMO), the AP comprising:
    one or more processors configured to select a common communication access channel for the plurality of VAPs, and to control the AP with communication with Virtual Access Points (VAPs), and
    a transceiver configured to transmit acknowledgement control signals to the plurality of VAPs to control the plurality of VAPs to:
        transmit respective acknowledgement requests to stations, wherein at least two of the stations are associated with different VAPs of the plurality of VAPs; and
        receive, from the stations, respective block acknowledgements,
    wherein the one or more processors are further configured to control a simultaneous transmission, via the plurality of VAPs, of a frame to the at least two of the stations that are associated with different VAPs,
    wherein the frame comprises a common Multiple-VAP group identification for the at least two of the stations, and
    wherein (i) the respective acknowledgment requests received by the stations, (ii) simultaneously transmitting the frame to the at least two of the stations, and (iii) the respective block acknowledgements received by the stations, all occur within a same transmission opportunity (TXOP) using the selected common communication channel.

9. The AP of claim 8, wherein the transmitting is based on IEEE 802.11ac Very High Throughput (VHT) Multi-User Multiple-Input Multiple-Output (MU-MIMO).

10. The AP of claim 8, further comprising:
    a database comprising the common Multiple-VAP group identification for the stations and user transmission positions for the respective stations, and
    wherein the frame further comprises the user transmission positions.

11. The AP of claim 10, wherein the simultaneous transmitting of the frame including the common Multiple-VAP group identification and the user positions occurs within a same Physical Layer Convergence Procedure (PLCP) Protocol Data Unit (PPDU).

12. The AP of claim 10, wherein the transmitting of the acknowledgement requests, the reception of the block acknowledgements, and the transmitting of the group identification and the user positions occur during a same transmission opportunity.

13. The AP of claim 8, wherein the common channel for the VAPs is selected based on a criteria selected from a group of criteria consisting of connectivity, Quality of Service (QoS), and Key Performance Indicators (KPIs).

14. The AP of claim 8, wherein the one or more processors are further configured to dynamically allocate, based on physical transmission frames, a number of concurrent spatial streams in a transmission to the stations.

15. A wireless system based on Institute of Electrical and Electronics Engineers (IEEE) 802.11 Multi-User (MU) Multiple-Input and Multiple-Output (MIMO), comprising:
    a plurality of Virtual Access Points (VAPs);
    a plurality of stations, at least two of the stations being associated with different VAPs of the plurality of VAPs; and an access point (AP) including:
  one or more processors configured to select a common communication access channel for the plurality of VAPs, and to control the AP with communication with the plurality of VAPs, and
  a transceiver configured to transmit acknowledgement control signals to the plurality of VAPs to control the plurality of VAPs to transmit respective acknowledgment requests to the plurality of stations, and to receive, from the stations, respective block acknowledgements,
wherein the AP is further configured to control a simultaneous transmission, via the plurality of VAPs, of a frame to the at least two of the stations that are associated with different VAPs,
wherein the frame comprises a common Multiple-VAP group identification for the at least two of the stations, and
wherein (i) transmitting the respective acknowledgment requests to the stations, (ii) simultaneously transmitting the frame to the at least two of the stations, and (iii) transmitting the respective block acknowledgements by the stations, all occur within a same transmission opportunity (TXOP) using the selected common communication channel.

16. The wireless system of claim 15, wherein the AP further comprises:
  a database comprising the common Multiple-VAP group identification for the stations and user transmission positions for the respective stations, and
  wherein the frame further comprises the user transmission positions.

17. The transmission method of claim 7, wherein dynamically allocating the concurrent spatial streams in the transmission to the stations is performed based upon monitoring Enhanced Distributed Coordination Function (EDCF) decisions associated with the plurality of VAPs and indicating when a Multi-User Multiple-Input Multiple-Output (MU-MIMO) transmission can be applied.

18. The transmission method of claim 1, further comprising:
  when a new common communication channel is obtained by one of the plurality of Virtual Access Points (VAPs), sharing, by the one of the plurality of VAPs, the new common communication channel with each of the other plurality of VAPs.

19. The transmission method of claim 18, wherein the common Multiple-VAP group identification is selected as part of a medium access sharing process among each of the plurality of VAPs in the frequency and time domain.

* * * * *